US012759091B2

(12) United States Patent
Caristan et al.

(10) Patent No.: US 12,759,091 B2
(45) Date of Patent: Oct. 13, 2026

(54) METHOD, DEVICE AND COMPUTER PROGRAM FOR DETERMINING THE PERFORMANCE OF A WELDING METHOD VIA DIGITAL PROCESSING OF AN IMAGE OF THE WELDED WORKPIECE

(71) Applicant: L'Air Liquide, Société Anonyme pour l'Etude et l'Exploitation des Procédés Georges Claude, Paris (FR)

(72) Inventors: Charles Caristan, Conshohocken, PA (US); Jean-Pierre Planckaert, Monneville (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 997 days.

(21) Appl. No.: 17/920,224

(22) PCT Filed: Apr. 9, 2021

(86) PCT No.: PCT/EP2021/059303

§ 371 (c)(1),
(2) Date: Oct. 20, 2022

(87) PCT Pub. No.: WO2021/213817

PCT Pub. Date: Oct. 28, 2021

(65) Prior Publication Data

US 2023/0191540 A1 Jun. 22, 2023

(30) Foreign Application Priority Data

Apr. 20, 2020 (FR) ...................................... 2003950

(51) Int. Cl.

| | |
|---|---|
| ***B23K 31/12*** | (2006.01) |
| ***B23K 9/095*** | (2006.01) |
| ***G06T 7/00*** | (2017.01) |
| ***G06T 7/194*** | (2017.01) |
| ***G06T 7/80*** | (2017.01) |
| ***G06V 10/26*** | (2022.01) |
| ***G06V 10/82*** | (2022.01) |

(52) U.S. Cl.

CPC .......... *B23K 31/125* (2013.01); *B23K 9/0953* (2013.01); *B23K 9/0956* (2013.01); *G06T 7/0004* (2013.01); *G06T 7/194* (2017.01); *G06T 7/80* (2017.01); *G06V 10/273* (2022.01); *G06V 10/82* (2022.01); *G06T 2207/20081* (2013.01); *G06T 2207/20084* (2013.01); *G06T 2207/30136* (2013.01); *G06T 2207/30152* (2013.01)

(58) Field of Classification Search

CPC ...... B23K 9/02; B23K 9/0953; B23K 9/0956; B23K 9/16; B23K 26/24; B23K 31/006; B23K 31/125; G06T 7/80; G06T 7/194; G06T 7/0004; G06T 2207/20081; G06T 2207/30136; G06V 10/82; G06V 10/273

See application file for complete search history.

(56) References Cited

U.S. PATENT DOCUMENTS

| | | | | |
|---|---|---|---|---|
| 2012/0152916 A1* | 6/2012 | Oowaki | ................. | B23K 26/03 219/121.64 |
| 2016/0139593 A1* | 5/2016 | Willett | ............. | G05B 19/41875 700/109 |
| 2021/0016383 A1 | 1/2021 | Ando et al. | | |

FOREIGN PATENT DOCUMENTS

| | | |
|---|---|---|
| CN | 109332928 | 2/2019 |
| JP | 2019 188421 | 10/2019 |
| WO | WO 2019 103772 | 5/2019 |

OTHER PUBLICATIONS

Machine translation of Guan (CN 109332928) performed on Sep. 16, 2025 (Year: 2019).*

Fukushima, K., Neocognitron: a self-organizing neural network model for a mechanism of pattern recognition unaffected by shift in position, Biological Cybernetics 36, 193-202 (1980).

International Search Report and Written Opinion for corresponding PCT/EP2021/059303, Jun. 1, 2021.

* cited by examiner

*Primary Examiner* — Brian W Jennison

(74) *Attorney, Agent, or Firm* — Allen E. White; Elwood L. Haynes

(57) ABSTRACT

The invention relates to a method for determining the performance of a welding method carried out on a metal workpiece, in particular an electric arc welding or laser welding method, with the following steps: introducing one or more extracts of the initial image each having at least one presumed projection, as input to at least one neural network, in particular a convolutional neural network, so as to classify the presumed projections as confirmed or unconfirmed projections, carrying out a second digital processing operation on the initial image comprising the previously classified projections so as to determine at least one parameter representative of the quantity of confirmed projections chosen from the surface of one or more projections.

14 Claims, 6 Drawing Sheets

METHOD, DEVICE AND COMPUTER PROGRAM FOR DETERMINING THE PERFORMANCE OF A WELDING METHOD VIA DIGITAL PROCESSING OF AN IMAGE OF THE WELDED WORKPIECE

CROSS REFERENCE TO RELATED APPLICATIONS

This application is a 371 of International Application No. PCT/EP2021/059303, filed Apr. 9, 2021, which claims priority to French Patent Application No. 2003950, filed Apr. 20, 2020, the entire contents of which are incorporated herein by reference.

BACKGROUND

The present invention relates to a method for determining the performance of a welding process carried out on at least one metal part, especially an arc-welding or laser-welding process, and to a device able and intended to implement said method.

It is known that the presence of molten metal spatters on the surface of a welded assembly is an indicator of the efficiency of the welding process and of the quality of the resulting weld. This is especially the case in arc welding, in particular in MIG or MAG welding (MIG standing for metal inert gas and MAG standing for metal active gas). These methods use an electric arc generated between the end of an easy melt metal wire and the metal parts to be welded to melt the metal from which the parts to be welded are made as well as the metal from which the easy melt wire is made, i.e. the filler metal, this generating a pool of liquid metal formed from the metal of the parts to be welded and from the metal of the molten easy melt wire transferred in the arc.

In order to control the detachment of the droplet from the end of the wire and its transfer to the melt pool, electronic current generators are used in which the welding operating parameters, especially the amperage of the current, the arc voltage, wire speed, etc. are programmed to vary in a predefined way, this making it possible to work in a transfer regime suitable for the welding process to be implemented. Poor parameterization can lead to an unstable transfer regime, resulting in the generation of many molten-metal spatters.

Likewise in laser welding, irrespectively of whether a filler is employed, the quality and productivity of the process can be correlated to the quantity of metal spatters. Specifically, during welding, a keyhole and a pool of molten metal are formed in the region irradiated with the laser beam. Liquid metal is pushed upwards. In case of instability in this liquid at the top of the keyhole, material is ejected from the region being welded, creating spatters on and around the weld and resulting in bumps and in shortages of material in the weld bead.

Spatter is an indication of a drop in productivity, caused by the loss of filler metal, the drop in welding speed and/or power that it implies and the additional time required to clean the welded parts.

There are different techniques for characterizing the spatters generated during a welding process. These techniques are most often based on observation in real time, i.e. while the welding is being carried out, of the spatters generated during the welding. For example, it is possible to use recordings made by means of a high-speed camera to follow the trajectories of the spatters and to count them.

Thus, devices for determining weld quality that count spatters in an image recorded during welding by a high-speed camera are known from documents US20120152916A and CN109332928A.

Moreover, a method for detecting and predicting welding defects using the results of welding simulations and neural networks is known from WO2019103772A1.

Techniques based on the analysis of audio recordings made during welding are also known.

Most existing techniques are therefore based on a dynamic analysis of spatters and require relatively complex equipment that must be installed on the site where the welding takes place, this possibly proving prohibitive for industrial-scale production installations and even more so for small-scale structures where there is less ability to make investments. Furthermore, this implies the use of very complex software, making the final installation expensive.

The problem to be solved is therefore that of providing a method for determining the performance of a welding process that is relatively simple to implement and that is usable more flexibly than prior-art methods.

The solution according to the invention is thus a method for determining the performance of a welding process carried out on at least one metal part, especially an arc-welding or laser-welding process, said method comprising the following steps:

a) acquiring, with an image-capturing device, at least one initial image of at least one surface segment of said part previously welded comprising a weld bead,
b) carrying out a first digital processing operation on the initial image so as to locate, in said initial image, presumed spatters,
c) inputting one or more extracts from the initial image, each comprising one presumed spatter, into at least one neural network, in particular a convolutional neural network, so as to classify the presumed spatters into confirmed spatters or unconfirmed spatters,
d) carrying out a second digital processing operation on the initial image comprising the spatters classified confirmed in step c) so as to determine at least one parameter representative of the quantity of confirmed spatters chosen from:
    - the area of one or more confirmed spatters,
    - the total area of the confirmed spatters, which is defined as the sum of the areas of each confirmed spatter,
    - the number of confirmed spatters,
    - the number of confirmed spatters per unit area,
    - spatter density, defined as the total area of confirmed spatters divided by the total area of the initial image,
    - the average of the distances between each confirmed spatter and the weld bead,
e) determining the performance of the welding on the basis of the at least one parameter determined in step d).

As applicable, the invention may comprise one or more of the following features:

- the image-capturing device is arranged in an information-technology system chosen from: a smartphone, a tablet, a laptop computer.
- the method comprises, previously to step a), a step of calibrating the image-capturing device comprising acquiring a plurality of images of the same two-dimensional pattern with the image-capturing device positioned, for each image, at a different predetermined distance from the two-dimensional pattern, said pattern then being positioned on said at least one surface segment of the part so as to be included in the initial image acquired in step a).

the method implements at least one statistical processing operation relating to said at least one parameter representative of welding performance, especially a statistical processing operation relating to the area of the confirmed spatters comprising determining at least one from among: the average area of the confirmed spatters, the minimum area and/or the maximum area of the confirmed spatters, the standard deviation of the area of the confirmed spatters, at least one population by number of confirmed spatters having an area greater than a predetermined low threshold and/or less than a predetermined high threshold.

a plurality of initial images are acquired at successive times and the values of the parameter representative of the quantity of confirmed spatters that is determined for each of the initial images are compared in order to detect any variation in said parameter.

said at least one initial image is acquired with the image-capturing device positioned at a distance comprised between 10 and 40 cm, preferably between 20 and 30 cm, above the weld.

the first digital processing operation carried out in step b) on the initial image comprises the following sub-steps: i) filtering the initial image so as to obtain a differentiation between the metal spatters and a background of the initial image, ii) removing the background of the initial image, iii) binarizing the filtered image resulting from step i), especially via brightness-based thresholding, so as to form a binary image with two pixel values, with, optionally, inversion of the values of the pixels of the binary image, iv) selecting one of the two pixel values so as to define, in the binary image, regions of interest formed by the pixels of the selected value, with, optionally, enlargement of said regions of interest, v) marking the regions of interest in the binary image and transposing the resultant markings to the initial image so as to locate presumed spatters therein.

previously to step c), a position is assigned to each of the presumed spatters located in step b), especially a position defined by two-dimensional coordinates, and said positions are each compared two by two, one of the two presumed spatters being ignored when the distance between the compared positions is smaller than a predetermined value.

in step c), the neural network comprises a plurality of convolutional layers, preferably three convolutional layers, at least one fully connected layer and at least one pooling layer, a pooling layer preferably being sandwiched between two convolutional layers.

in step c), the presumed spatters are classified into confirmed or unconfirmed spatters according to decision criteria defined via previous training of the neural network, said training being carried out by means of a set of training images comprising a plurality of sub-sets chosen from: a sub-set of training images each comprising at least one metal spatter, a sub-set of training images free of metal spatters, a sub-set of training images each comprising at least one defect, such as a scratch or a parasitic reflection, other than a spatter, a sub-set of training images each comprising at least one weld segment, said sub-sets each preferably comprising at least 1000 training images, more preferably at least 2000 training images.

in step c), the extracts from the initial image that are input into the neural network are associated with at least one piece of context information chosen from: the material of the metal part, the welding gas, the weld joint configuration, the metal transfer regime, the welding current voltage, the welding current amperage, the wire feed speed.

the method comprises, previously to step b), a step of pre-processing the initial image by applying at least one mask configured to remove from the initial image features, for example scratches and/or parasitic reflections, other than spatters.

the method comprises a step of remotely transmitting the initial image via a communication network, preferably the Internet, from the image-capturing device to a remote server, steps b) to e) being carried out by an electronic processing system located in the remote server.

Furthermore, the invention relates to a device for determining the performance of a welding process configured to implement a method according to the invention, said device comprising:

an image-capturing device configured to acquire said initial image, a memory for storing the initial image, an electronic processing system having access to said memory, said electronic processing system being configured to carry out the first digital processing operation and the second digital processing operation on the initial image, at least one neural network, in particular a convolutional neural network, configured to receive as input extracts from the initial image and to classify presumed spatters into confirmed spatters or unconfirmed spatters, an electronic logic circuit configured to determine the performance of the welding process on the basis of the at least one parameter representative of the quantity of spatters determined by the second digital processing operation.

According to another aspect, the invention relates to a computer program product downloadable from a communication network and/or stored on a medium that is computer readable and/or executable by a processor, characterized in that it comprises program-code instructions for implementing a method according to the invention.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DETAILED DESCRIPTION OF PREFERRED EMBODIMENTS

Figure 1:
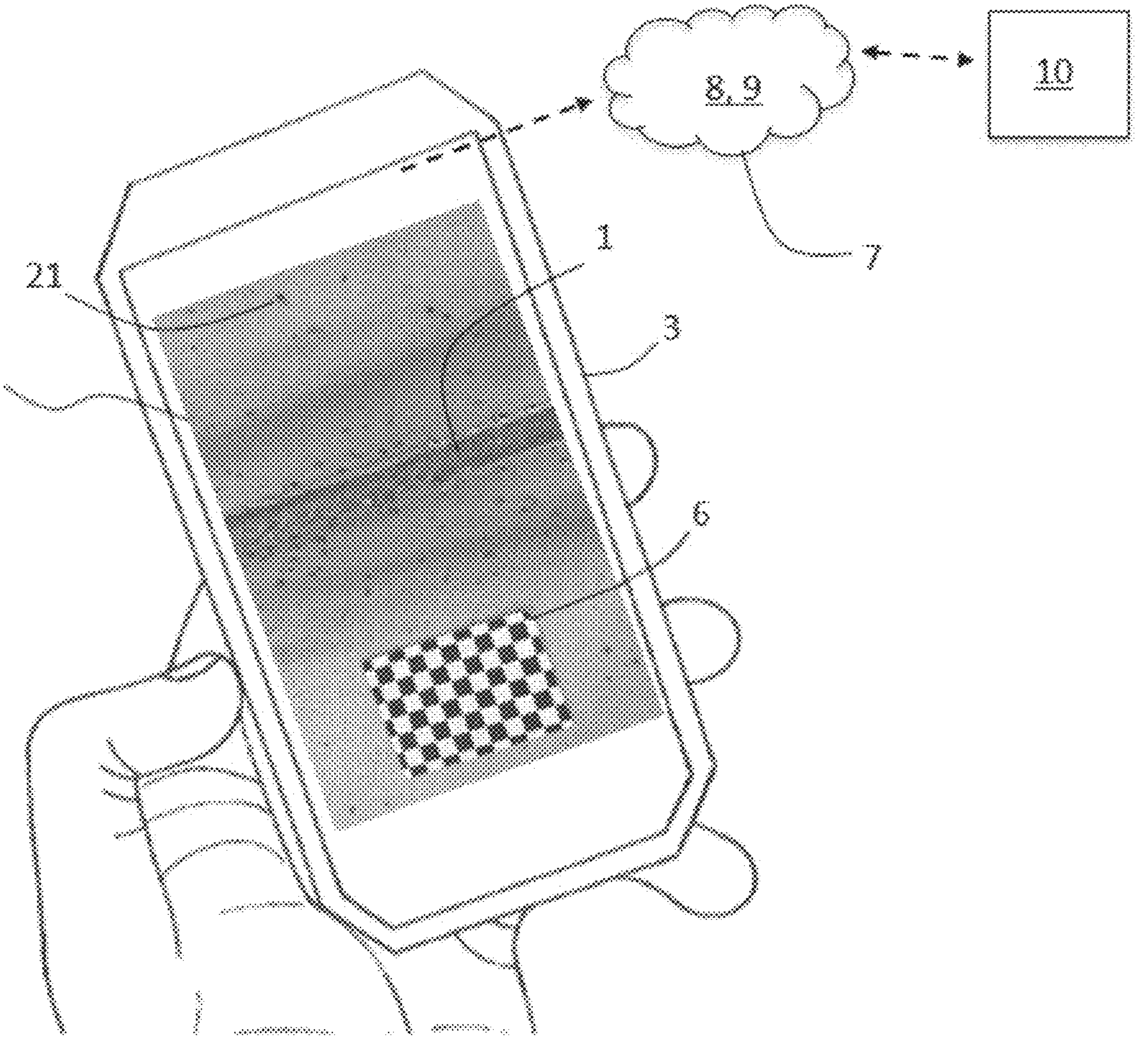
FIG. 1 schematically shows a step of acquiring an initial image according to one embodiment of the invention, FIG. 2 schematically shows steps of the method according to one embodiment of the invention.

FIG. 1 illustrates the acquisition of an initial image 2 of a surface segment of metal parts welded to each other by a weld 1. According to the invention, the initial image 2 is acquired once welding of the parts has finished, i.e. after a weld bead 1 corresponding to the region of resolidification of the metal from which the welded parts are made and of the filler metal where appropriate has been obtained. In other words, first said at least one part is welded and only after welding has finished is the initial image 2 acquired. Spatters therefore mean spatters present on the surface of the parts.

Contrary to techniques where spatters are observed in real time, i.e. while the welding is being carried out, the invention implements an analysis of an image of the spatters located on the surface of the part after it has finished being welded. The analyzing equipment, especially the image-capturing device, software, etc., may therefore be less complex. The analysis of the image is carried out a posteriori, such a posteriori analysis avoiding the need to install the image-acquiring and image-processing devices on the site where the welding takes place, where there may be less ability to make investments. Furthermore, this implies the use of very complex software, making the final installation expensive. The method according to the invention is thus simpler to implement and more flexible. In particular, image-capturing devices simpler than a high-speed camera may be used.

Preferably, the image-capturing device 3 is a smartphone, though it will be understood that other types of portable information-technology systems are envisionable such as a tablet, a laptop computer, a connected watch.

Preferably, the initial image 2 is acquired with the image-capturing device 3 positioned at a distance comprised between 10 and 40 cm, preferably between 20 and 30 cm, above the weld 1. The image-capturing distance is defined by a compromise between the resolution of the image 2 and the size of the analyzed surface segment. It will be noted that the image-capturing distance corresponds to the distance between the objective of the device and the surface of the part.

Advantageously, previously to the acquisition of the initial image 2, a calibration of the image-capturing device 3 is carried out using at least one image of the same two-dimensional pattern 6 captured with the image-capturing device 3. The pattern 6 has known real dimensions and is placed at a known predetermined distance from the device 3, this making it possible to associate a real dimension with a pixel.

Preferably, a plurality of images of the same two-dimensional pattern 6 captured with the image-capturing device 3 are used. For each image, the pattern 6 is positioned at a different predetermined distance from the device 3. This pattern 6 comprises characteristic elements of known dimensions, for example a regular grid with two pixel values. Preferably, at least 2, or even at least 5 images of the pattern 6 captured at different distances are used, in order to avoid any calibration error. In step a), the pattern 6 is positioned on the surface segment of the part so as to be included in the initial image 2.

By virtue of the calibration, it is possible to correlate the dimensions of the pixels of the initial image with real dimensions in order to compute the real dimensions of the spatters, without it being necessary to precisely control the distance from which the image is captured, this being useful especially in the case where the device 3 is in a telephone held by an operator.

A first digital processing operation is then carried out on the initial image 2 so as to locate, in the initial image 2, presumed spatters 21.

These spatters are said to be presumed because defects present on the surface of the parts, for example scratches or parasitic reflections, can be confused with spatters during the first image processing operation.

Figure 2:
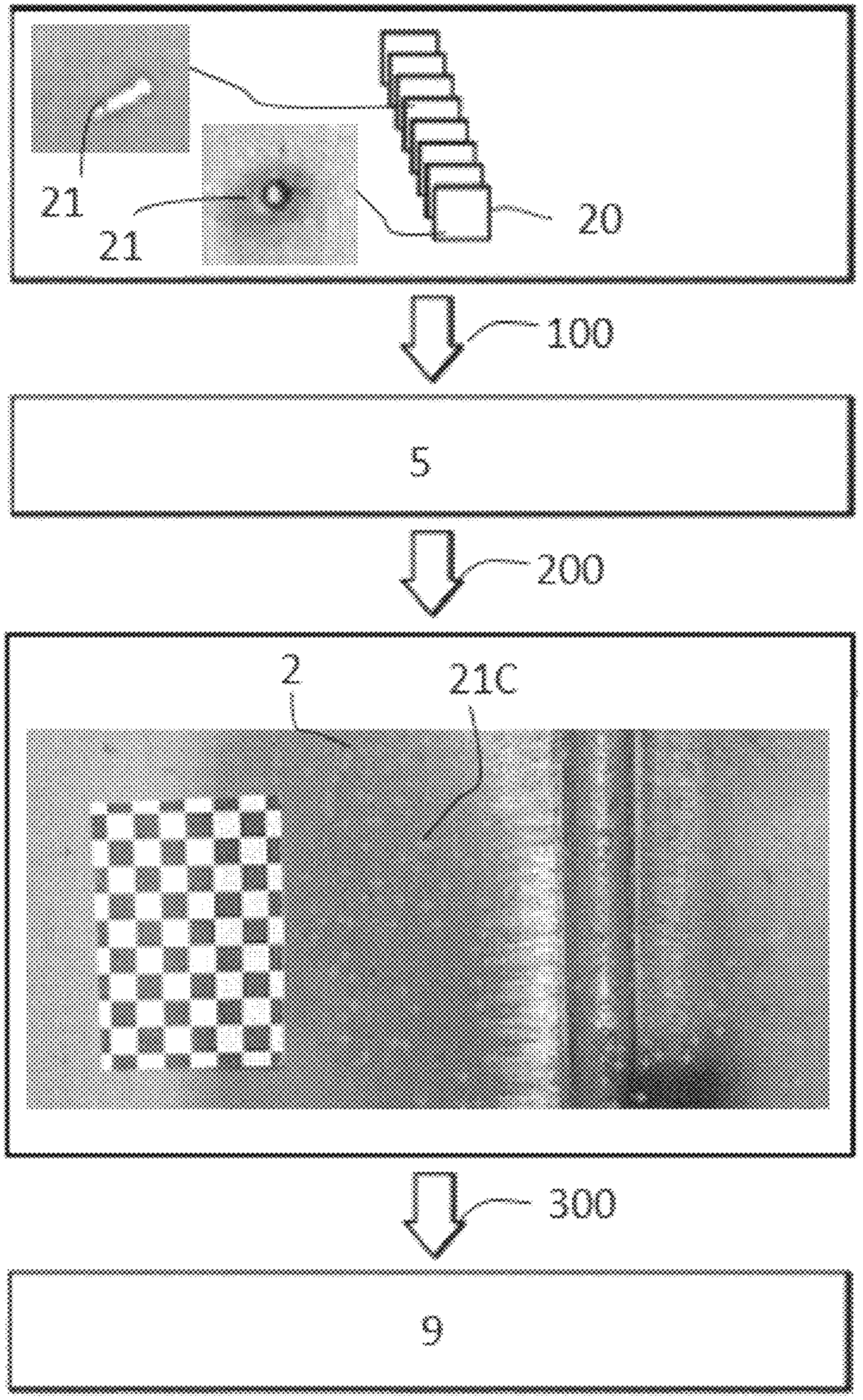

FIG. 2 shows a schematic of the steps of the method according to one embodiment of the invention. In order to differentiate spatters located on the parts from other imperfections, the method according to the invention uses at least one neural network 5, in particular a convolutional neural network, that receives as input data, in the step referenced 100, one or more extracts 20 from the initial image 2 each comprising one presumed spatter 21. Preferably, each extract 20 comprises only one spatter. The neural network 5 is configured to carry out a classification, in the step referenced 200, of the presumed spatters of each extract 20 into confirmed spatters 21C or unconfirmed spatters 21N. Preferably, the neural network operates on a plurality of extracts 20 successively input into the network.

As known, artificial neural networks are computational models that imitate how biological neural networks work. Artificial neural networks comprise neurons interconnected by synapses, the latter conventionally being implemented via digital memories. The synapses may also be implemented via resistive components the conductance of which varies depending on the voltage applied across their terminals.

Convolutional neural networks are one particular artificial-neural-network model. They were originally described in the article by K. Fukushima, "Neocognitron: A self-organizing neural network model for a mechanism of pattern recognition unaffected by shift in position. Biological Cybernetics, 36(4): 193-202, 1980. ISSN 0340-1200. DOI: 10.1007/BF00344251".

Convolutional neural networks (also called deep (convolutional) neural networks or ConvNets) are feedforward neural networks without feedback inspired by biological visual systems.

Convolutional neural networks (CNNs) are especially used in image-classifying systems to accelerate classification. Applied to image recognition, these networks make it possible to classify intermediate representations of objects in the images that are smaller therethan and generalizable to similar objects, this facilitating their recognition.

Figure 6:
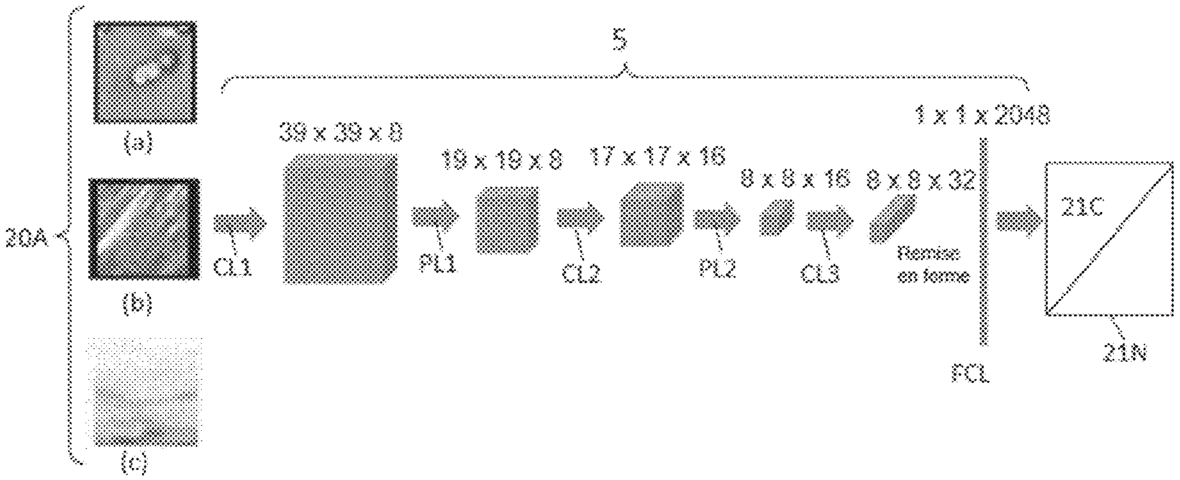
FIG. 6 shows training of the neural network according to one embodiment of the invention.

Preferably, the presumed spatters are classified into confirmed or unconfirmed spatters according to decision criteria defined via previous training of the neural network 5. During this training, one example of which is schematically shown in FIG. 6, the neural network is taught to automatically categorize an image extract into one of a finite number of categories (also called classes). In the case of the present invention, the classification is into at least two classes, a class "confirmed spatter" 21C, and a class "unconfirmed spatter" 21N covering occurrences in the image 2 other than spatters. The class "unconfirmed spatter" may optionally be refined into a plurality of sub-classes, for example a sub-class "scratch", a sub-class "reflection", a sub-class "shadow", etc.

The training is carried out by means of a set of training images 20A that comprise a plurality of examples of each class or sub-class, as illustrated in FIG. 6. Thus, the training images comprise a plurality of sub-sets chosen from: a sub-set of training images each comprising at least one metal spatter (image referenced (a)), a sub-set of training images free of metal spatters, a sub-set of training images each comprising at least one defect, such as a scratch (image referenced (b)) or a parasitic reflection, other than a spatter, a sub-set of training images each comprising at least one weld segment (image referenced (c)), said sub-sets each preferably comprising at least 1000 training images, more preferably at least 2000 training images.

Preferably, the training images each comprise at least one surface segment of an already welded sample. The samples comprise various types of welds obtained using various processes, especially arc welding, in particular MIG or MAG welding, laser welding, hybrid laser-arc welding, etc., and in various welding configurations, especially a butt-weld configuration, a fillet-weld configuration, etc., in order to train the neural network in the most exhaustive way possible so that it may identify spatters on most welds produced on an industrial scale.

After the spatters have been classified, a second digital processing operation is carried out on the initial image 2 in which the confirmed spatters 21C have been located. The second digital processing operation is configured to determine, on the basis of the initial image 2, at least one parameter representative of the quantity of confirmed spatters, this parameter being chosen from the area of one or more confirmed spatters 21C, the total area of the confirmed spatters 21C, which is defined as the sum of the areas of each confirmed spatter 21C, the number of confirmed spatters 21C, the number of confirmed spatters 21C per unit area, the total weight of the confirmed spatters 21C, the density of the spatters, which is defined as the total area of the confirmed spatters 21C divided by the total area $S_2$ of the initial image 2, the average of the distances between each confirmed spatter 21C and the weld bead 1.

Preferably, $S_2$ is the actual total area of the initial image 2 acquired in step a), which may be expressed in $cm^2$ or $mm^2$.

Preferably, considering a weld bead 1 extending along a longitudinal axis parallel to the welding direction and positioned at the center of the bead, the distance between a spatter and the bead is defined as the shortest distance separating said spatter from the longitudinal axis.

The performance of the welding process is determined on the basis of the at least one parameter representative of the quantity of confirmed spatters.

It will be noted that the performance of the welding process may be assessed in terms of criteria in respect of the quality of the weld bead resulting from the process, especially morphological considerations such as the appearance of the surface of the bead and/or of the surface of the part around the bead, depth of penetration and/or in terms of criteria in respect of welding efficiency such as welding speed, proper adjustment of the welding operating parameters, deposition rate, expressed in units of mass of molten metal resolidified per unit time (kg/hour), production rate, expressed in units of mass of molten metal resolidified per unit bead length (kg/m).

In particular, assessment of the performance of a welding process may mean assessment of one or more of the following aspects: assessment of the adjustment of the welding operating parameters, which parameters especially comprise the regime of metal transfer, welding current voltage, welding current amperage, wire feed speed, assessment of the quality of the resulting weld, assessment of the welding layout, i.e. positioning of the parts, of the welding torch.

It will be understood that the invention may be applied to the assessment of the performance of any welding process that involves melting and that is liable to produce spatters, such as arc welding, or laser welding, irrespectively of whether a laser beam is used alone or in combination with an electric arc. The invention may especially be applied to a welding process used in an LMD or SLM additive-manufacturing process (LMD standing for laser metal deposition and SLM standing for selective laser melting).

Advantageously, the total area of the confirmed spatters 21C and/or the density of spatters, which is defined as the total area of the confirmed spatters 21C divided by the total area $S_2$ of the initial image 2, are/is used as parameter representative of the quantity of spatters. The use of a parameter related to spatter area allows an even more accurate quantification of the quantity of spatters produced. In particular, the density of spatters and/or the total area of the spatters allows welding-efficiency criteria, such as the deposition rate or the production rate of the process, to be assessed even more effectively. These indicators are also gauges of the material lost to spatters and not transferred to the bead.

Alternatively or additionally, the number of spatters per unit area, which may be determined by dividing the number of confirmed spatters 21C by the total area $S_2$ of the initial image 2, may be used.

The use of these indicators leads to an objective determination of welding performance, which may provide an absolute indication of welding performance, but also a relative one as parameters may be compared by comparing various initial images 2. These initial images 2 may be acquired following welding carried out in the same welding workshop or at the same welding station at different times, or at various welding stations or in various welding workshops. It is also possible to compare the one or more parameters representative of performance determined by virtue of the method of the invention with reference values that may be determined by implementing the method of the invention on an initial image obtained under optimal welding conditions.

The method according to the invention may furthermore implement at least one statistical processing operation relating to said at least one parameter representative of welding performance, especially a statistical processing operation relating to the area of the confirmed spatters comprising determining at least one from among: the average area of the spatters, the minimum area and/or the maximum area that the spatters have, the standard deviation of the area of the spatters, at least one population by number of spatters having an area greater than a predetermined low threshold and/or less than a predetermined high threshold. The implementation of a statistical processing operation makes it possible to further improve the effectiveness and the precision of detection of the spatters.

It is also envisionable to define one or more correlation rules correlating the at least one parameter and a plurality of predetermined qualitative states stored in a database 10 and to which a value or a range of values of the parameter will have been assigned beforehand.

The quality of the weld may be determined via an electronic logic circuit 9 able to receive and process the parameter.

Preferably, the first and second digital processing operations are carried out by an electronic processing unit 8. The digital processing system 8 and the electronic logic circuit 9 each comprise at least one from among: a microcontroller, a microprocessor, a computer, a memory. The devices 8 and 9 may optionally be merged into one and the same digital processing assembly configured to carry out the various image- and data-processing steps of the method according to the invention.

Advantageously, the digital processing system 8, the electronic logic circuit 9 and/or the database 10 are located on a remote server 7 to which the image-capturing device 3 sends the acquired images 2, as shown in FIG. 1. It is also possible to implement the training, classifying and/or pre-processing steps on the remote server 7.

Processing the collected data and images remotely from the image-capturing device 3 makes it possible to perform image-processing operations and computations on a large amount of collected data, without complicating the image-capturing device 3 used by the operator or requiring it to be overdesigned.

Preferably, the image-capturing device 3 makes exchanges with the remote server 7 via a communication network such as the Internet. The image-capturing device 3 may use wireless remote communication protocols, for example 3G, 4G, Wi-Fi.

The image-capturing device 3 advantageously comprises an information-technology system that uses a software application to acquire, process and/or transmit images and data to the remote server 7. The application may be designed to work with information-technology systems of mobile devices (iOS and Android) or fixed devices (Windows and Mac).

Once the information on welding performance has been obtained, it may be transmitted to the operator who carried out the welding and/or acquired the initial image 2 via transmission from the remote server 7 to the image-capturing device 3. The information can also be remotely transmitted to another user, for example a manager of the welding workshop in which the welding was carried out. The collected data (images, qualities, welding parameters) may also be stored in a database, and optionally time-stamped, with a view to subsequent use, for example to compute statistics, to surveil the variation as a function of time in at least one parameter representative of welding performance in order to detect a potential drift in the parameter and/or to perform a predictive analysis of the behavior of the welding station based on the surveillance of said parameter.

According to a particular embodiment, the method comprises acquiring a plurality of initial images 2 at successive times. Said images 2 may for example be acquired at times separated by a duration ranging from one day to one or more weeks, or even one or more months, and up to one year. The values of the parameter representative of the quantity of confirmed spatters 21C that is determined for each of the initial images 2 are compared in order to detect any variation in said parameter, as it may be representative of a failing on the part of the operator and/or of the welding equipment.

Figure 3:
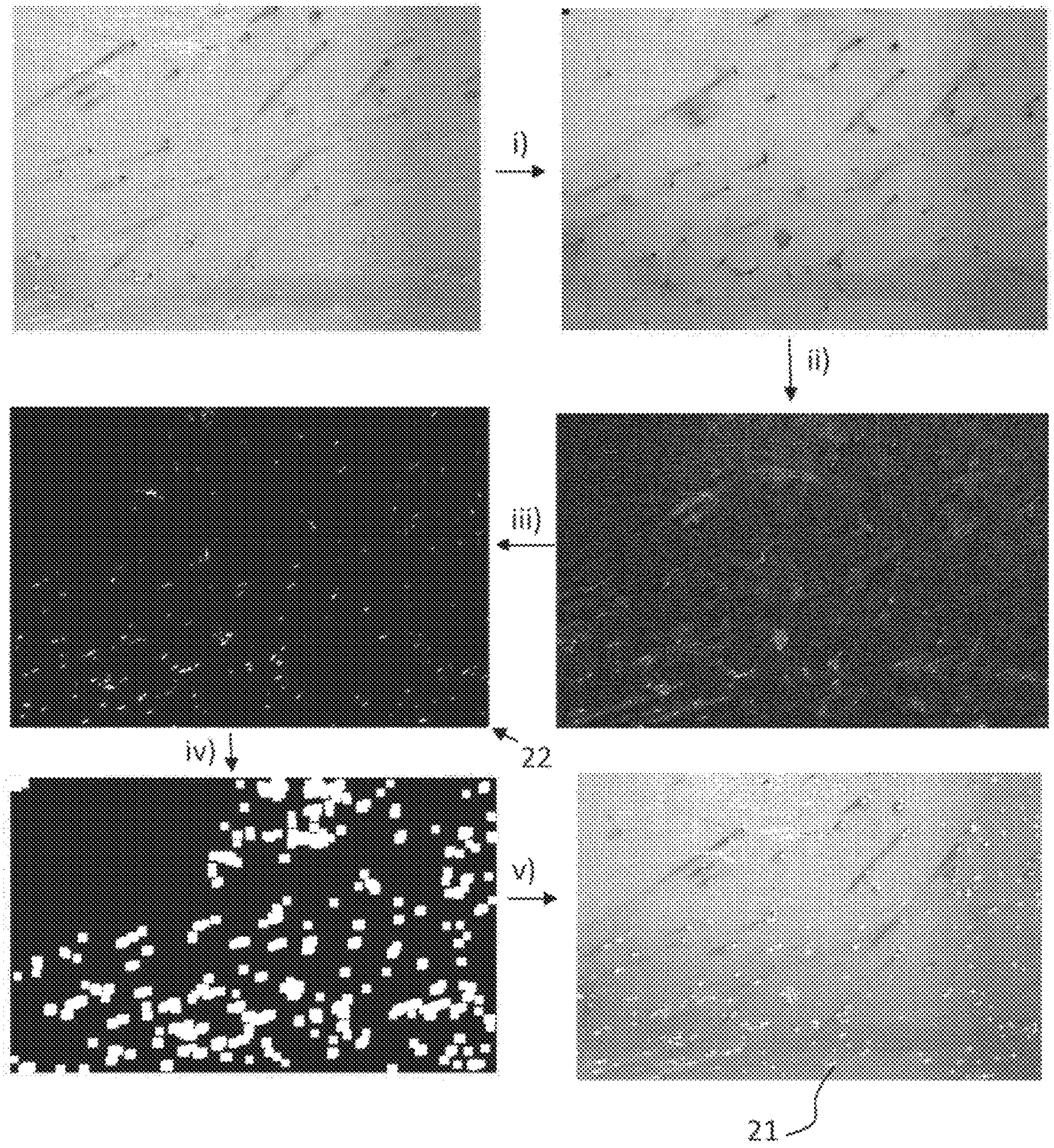
FIG. 3 shows steps of a first digital image processing operation according to one embodiment of the invention.
Figure 4:
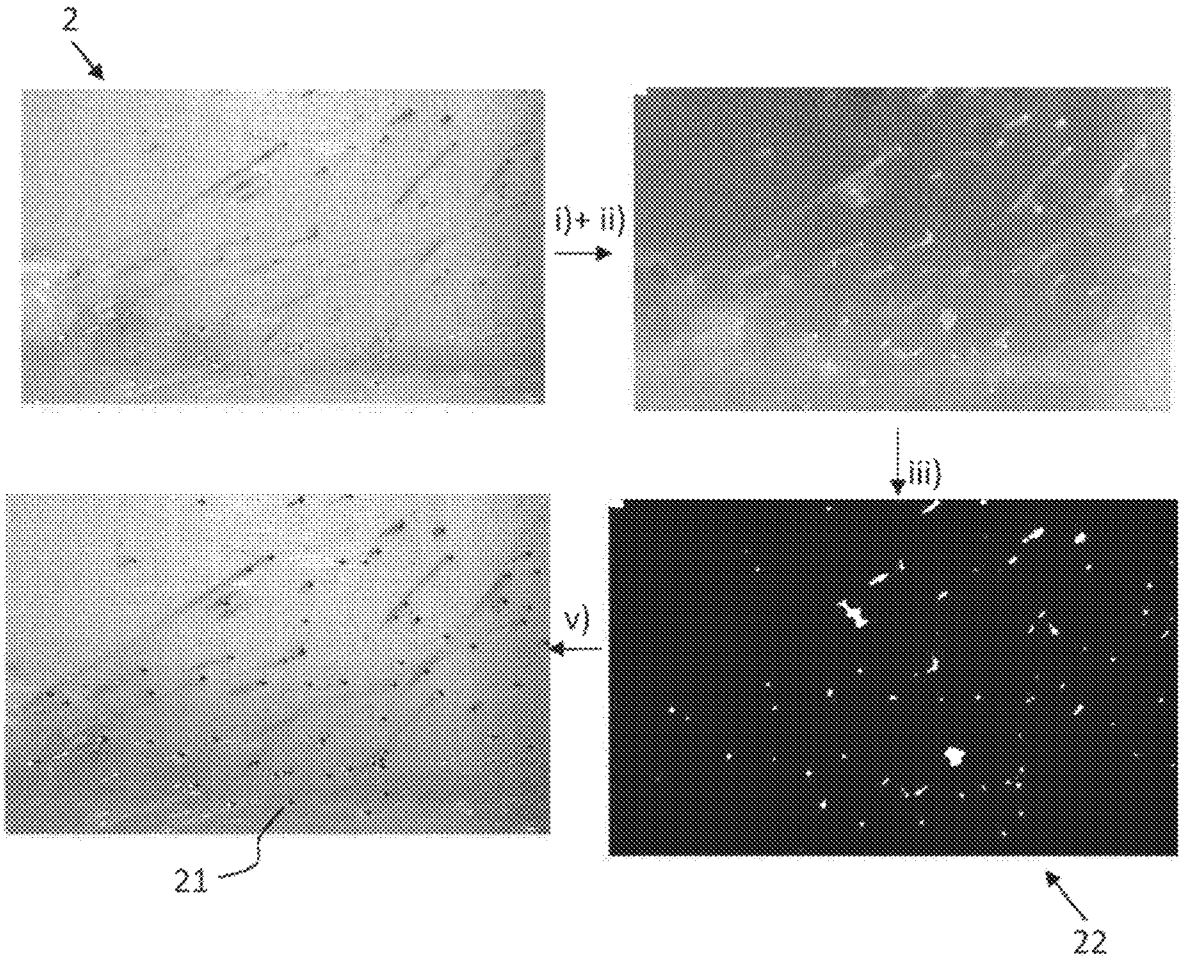
FIG. 4 shows steps of a first digital image processing operation according to another embodiment of the invention.

FIGS. 3 and 4 illustrate possible steps of a first digital image processing operation allowing presumed spatters 21 to be located in an image 2. The inventors of the present invention have discovered elements that are characteristic of spatters, in particular a region appearing brighter than the rest of the image 2 and located towards the center of the spatter and a peripheral region of the spatter that appears darker due to surface oxidation.

It will be noted that the initial image 2 acquired in step a) is preferably a color image coded with an RGB color-coding format (RGB standing for red, green, blue), each pixel of the image 2 having 3 components, one red, one green, one blue, attributed thereto. Preferably, the initial image 2 is converted into grayscale before the first digital processing operation is applied thereto. The final step of the first digital processing operation is to mark the presumed spatters in the initial image 2. The marked initial image 2 is preferably in RGB format. The resultant markings are used to define the extracts 20 to be input into the neural network 5.

FIG. 3 illustrates the case where spatters are located in the image 2 by detecting a bright center. The initial image 2 is first filtered in order to extract and remove a background therefrom, Parasitic effects due to a non-uniform illumination of the surface segment are thus avoided. The initial image is converted into a binary image 22 via thresholding. The initial image 2 takes the form of a two-dimensional matrix array of pixels having given brightness values. Thresholding may be achieved by assigning the same value to all the pixels the values of which are greater than or less than a threshold value, and by assigning another value to the remaining pixels. After selection of regions identified as of interest, these regions are located and marked in the binary image 2. The resultant markings are transposed to the initial image 2 (white crosses), which then allows the extracts from the image 2 to be input into the neural network 5 to be located.

FIG. 4 illustrates the case where spatters are located in the image 2 by detecting a dark region. The first digital processing operation comprises an additional step of inverting the pixel values of the binary image 22. The markings of the presumed spatters 21 are in the end transposed to the initial image 2 (black crosses).

According to one particular embodiment, a position is assigned to each of the presumed spatters 21 located at the end of the first digital processing operation, especially a position defined by two-dimensional coordinates, and said positions are each compared two by two. When the distance between the compared positions is less than a predetermined value, typically less than 20 pixels in the image 2, one of the two presumed spatters the positions of which were compared is ignored. This makes it possible to delete duplicates in the case where spatters feature both a bright center and a dark region.

Optionally, previously to step b), a step of pre-processing the initial image 2 is carried out by applying at least one mask configured to remove from the initial image 2 at least some features, for example scratches and/or parasitic reflections, other than spatters.

Figure 5:
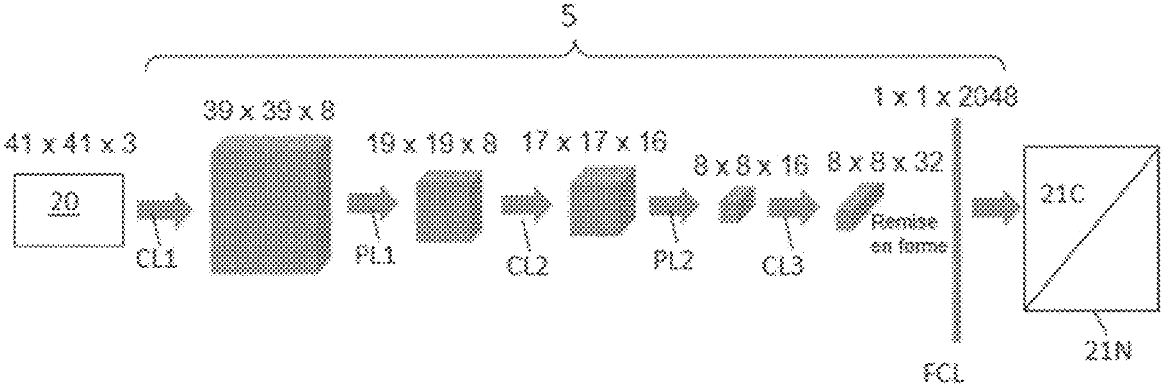
FIG. 5 shows processing steps of processing an extract from the initial image using a neural network according to one embodiment of the invention.

FIG. 5 illustrates one possible architecture for a convolutional neural network 5 receiving as input an extract 20 that is 41×41×3 pixels in size. It will be noted that the size 41×41×3 was chosen because it corresponds to the typical size of a spatter in the image. The neural network 5 comprises a first convolutional layer CL1 made up of 8 filters that are 5×5 pixels in size. The function of this layer CL1 is to compute the output of neurons connected to local regions in the input, each computing a scalar product between their weights and a region to which they are connected in the input volume.

CL1 is followed by a first pooling layer PL1 that is 2×2 pixels in size. It allows a down-sampling operation to be carried out along the spatial dimensions (width, height), resulting in a volume such as 19×19×8.

Two new convolutional layers CL2 and CL3 follow, these being made up of 16 filters that are 5×5 pixels in size and of 32 filters that are 3×3 pixels in size, respectively.

A second pooling layer PL2 that is 2×2 pixels in size is arranged between CL2 and CL3 for a down-sampling operation. At the output of CL3, the obtained volume is 8×8×32, which volume is flattened into a fully connected layer FCL of 1×1×2048 that is part of the architecture and connected to a decision stage for classifying the presumed spatters. The layers CL and FCL perform transformations that depend not only on the activations of the input volume, but also on parameters (the weights and biases of the neurons).

It will be noted that, preferably, in step c), the neural network 5 successively operates on a series of extracts 20 from the initial image 2 each having dimensions of N×M×3 pixels, where M and N are integer numbers comprised between 32 and 224, preferably between 32 and 60. The dimensions of the extracts are chosen depending on the dimensions of the spatters, preferably so that there is only one spatter in each extract 20. The terms "×3" correspond to the 3 elementary colors red, green and blue and indicate that the extract 20 has an RGB coding format, each pixel having 3 components, one red, one green, one blue, assigned to it.

In order to demonstrate the effectiveness of the spatter detection used in the method according to the invention, various welding operations have been carried out on various materials, in various weld-joint configurations, with various shielding gases (see Table 1) and various operating parameters. The results obtained are given in tables 2 and 3 below.

The distribution of the number of spatters indicates the distribution of the population of confirmed spatters as a function of their individual area $S_{21}$. $S_{21tot}$ is the total area of the confirmed spatters as computed in step d) of the method. $S_2$ is the actual total area of the acquired initial image 2. Detection accuracy is defined as the ratio between the number of confirmed spatters and the actual number of spatters found on the surface of the welded parts.

It will be noted that, in Table 2, the poorer accuracy of test No. 3 was a result of a saturation of the image 2 as a result of a reflection of the light, something that the operator could easily have avoided.

Figure 7:
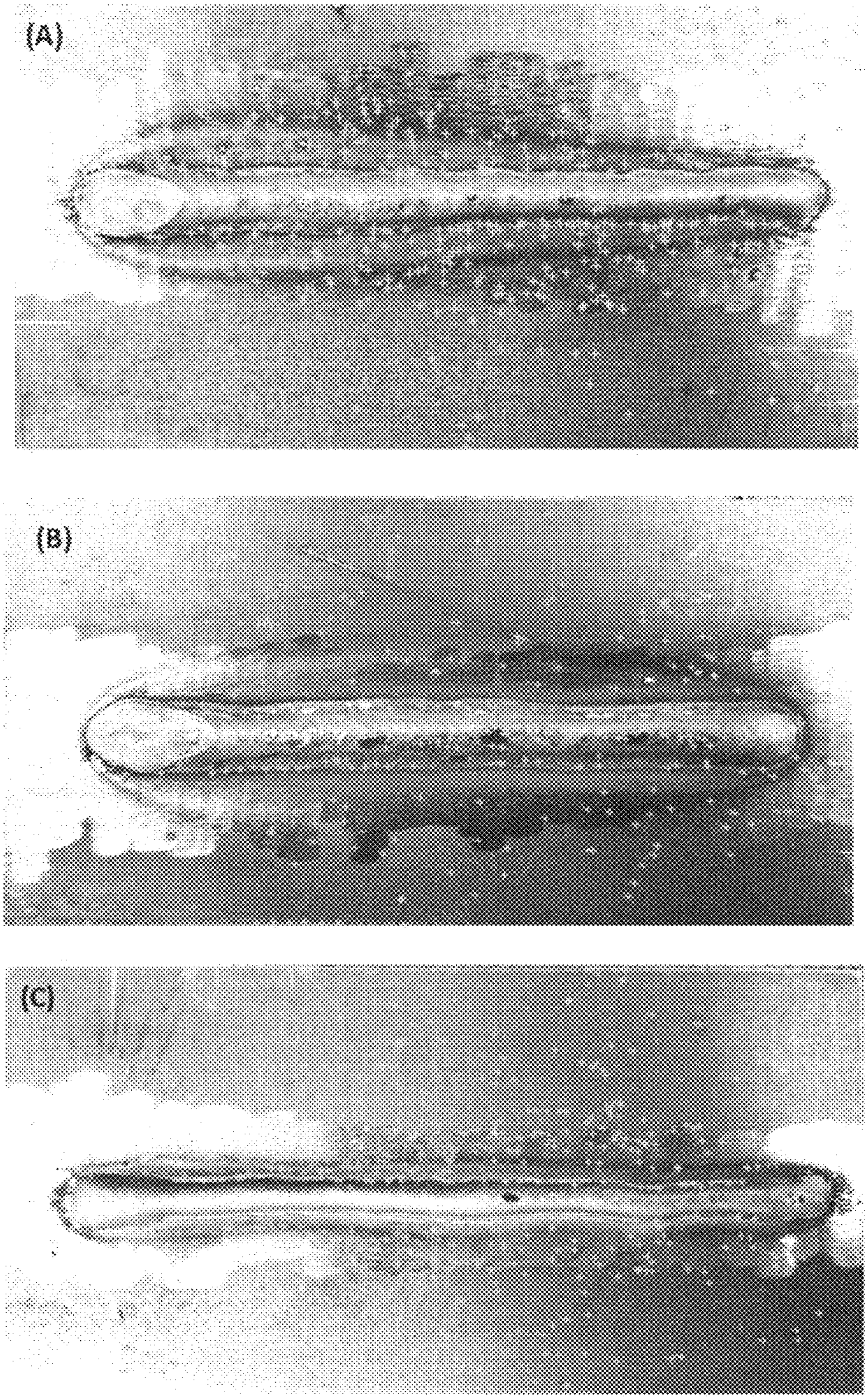
FIG. 7*a* shows an example of an initial image in which confirmed spatters have been located.
FIG. 7*b* shows an example of an initial image in which confirmed spatters have been located.
FIG. 7*c* shows an example of an initial image in which confirmed spatters have been located.

It may for example be seen that, in the absence of shielding gas (Table 2, test No. 4), the weld may be qualified poor given that the total area and the density of spatters are significantly higher than in the others tests. It may also be seen that the globular and short-circuit transfer regimes generate more spatters than the axial spray regime (Table 3). FIG. 7 shows images of welds on 6 mm thick parts measuring 76×152 mm in the globular regime (A), spray regime (B) and short-circuit regime (C). Confirmed spatters have been marked by crosses in the acquired initial images 2

TABLE 1

| No. | Material | Types of joint | Shielding gas |
|---|---|---|---|
| 1 | 836 carbon steel | Butt | ARCAL ™ Force (Ar + 18% CO2 |
| 2 | 836 carbon steel | Lap | ARCAL ™ Force (Ar + 18% CO2 |
| 3 | 836 carbon steel | Fillet, 90° | ARCAL ™ Force (Ar + 18% CO2 |
| 4 | 316L stainless steel | Butt | Without gas |
| 5 | 316L stainless steel | Butt | ARCAL ™ Chrome (Ar + 2% CO2 |

TABLE 2

| | Distribution of the number of spatters | | | | | | | |
|---|---|---|---|---|---|---|---|---|
| No. | <0.5 mm$^2$ | Between 0.5 and 1 mm$^2$ | Between 1 and 3 mm$^2$ | >3 mm$^2$ | $S_2$ (mm$^2$) | Detection accuracy | $S_{21tot}$ (mm$^2$) | Density ($S_{21tot}/S_2$) |
| 1 | 191 | 6 | 6 | 3 | 18225.5 | 98% | 42.7 | 0.0023 |
| 2 | 20 | 1 | 0 | 0 | 8021.25 | 90% | 1.633 | 2.036e−4 |
| 3 | 95 | 2 | 1 | 0 | 5791.5 | 88% | 19.2 | 0.0033 |
| 4 | 238 | 22 | 29 | 10 | 22021.87 | 98% | 138.94 | 0.0063 |
| 5 | 23 | 1 | 3 | 0 | 8565.75 | 95% | 6.4 | 7.472 e−4 |

TABLE 3

| | | | | Distribution of the number of spatters | | | | | |
|---|---|---|---|---|---|---|---|---|---|
| No. | Transfer regime | Voltage (V) | Wire speed (inches/min) | <0.5 mm$^2$ | Between 0.5 and 1 mm$^2$ | Between 1 and 3 mm$^2$ | >3 mm$^2$ | $S_{21tot}$ (mm$^2$) | Density ($S_{21tot}/S_2$) |
| 1 | Globular | 29 | 380 | 359 | 10 | 12 | 4 | 66.6 | 0.0057 |
| 2 | Spray | 25.5 | 380 | 260 | 5 | 10 | 0 | 37.3 | 0.0032 |
| 3 | Short-circuit | 19.5 | 380 | 372 | 17 | 7 | 1 | 42 | 0.0036 |

The method according to the invention may be implemented after any welding process to assess weld quality, in particular after MIG welding, MAG welding, laser welding or hybrid laser-arc welding. In the context of the invention, the metal parts to be welded may be arranged in various configurations, especially in a butt-weld configuration or indeed in a fillet-weld configuration, i.e. a configuration in which the parts to be welded are inclined with respect to each other so that the upper surfaces thereof make an angle to each other, or a lap-weld configuration, and have undergone any type of edge preparation (edges smoothed, square, beveled, etc.).

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A method for determining the performance of a welding process carried out on at least one metal part, comprising:

a) acquiring, with an image-capturing device, at least one initial image of at least one surface segment of said part b) carrying out a first digital processing operation on the initial image, thereby locating, in said initial image, presumed spatters, c) inputting one or more extracts from the initial image, each comprising one presumed spatter, into at least one neural network, so as to classify the presumed spatters into confirmed spatters or unconfirmed spatters, wherein step a) is carried out on said part previously welded comprising a weld bead, welding of said part having finished, confirmed spatters being located on the surface of said part, and further comprising:

d) carrying out a second digital processing operation on the initial image comprising the spatters classified confirmed in step c) thereby determining at least one parameter representative of the quantity of confirmed spatters chosen from:

the area of one or more confirmed spatters, the total area of the confirmed spatters, which is defined as the sum of the areas of each confirmed spatter, the number of confirmed spatters, the number of confirmed spatters per unit area, spatter density, defined as the total area of confirmed spatters divided by the total area of the initial image (2), the average of the distances between each confirmed spatter and the weld bead, and e) determining the performance of the welding process on the basis of the at least one parameter determined in step d), wherein the first digital processing operation carried out in step b) on the initial image comprises the following sub-steps:

i) filtering the initial image so as to obtain a differentiation between the metal spatters and a background of the initial image, ii) removing the background of the initial image, iii) binarizing the filtered image resulting from step i), especially via brightness-based thresholding, so as to form a binary image with two pixel values, iv) selecting one of the two pixel values so as to define, in the binary image, regions of interest formed by the pixels of the selected, v) marking the regions of interest in the binary image and transporting the resultant markings to the initial image so as to locate presumed spatters therein.

2. The method as claimed in claim 1, wherein the image-capturing device is arranged in an information-technology system chosen from: a smartphone, a tablet, a laptop computer.

3. The method as claimed in claim 1, further comprising, previously to step a), a step of calibrating the image-capturing device comprising acquiring a plurality of images of the same two-dimensional pattern with the image-capturing device positioned, for each image, at a different predetermined distance from the two-dimensional pattern, said pattern then being positioned on said at least one surface segment of the part so as to be included in the initial image acquired in step a).

4. The method as claimed in claim 1, further comprising implementing at least one statistical processing operation relating to said at least one parameter representative of the quantity of confirmed spatters, comprising determining at least one from among: the average area of the confirmed spatters, the minimum area and/or the maximum area of the confirmed spatters, the standard deviation of the area of the confirmed spatters, at least one population by number of confirmed spatters having an area greater than a predetermined low threshold and/or less than a predetermined high threshold.

5. The method as claimed in claim 1, wherein a plurality of initial images are acquired at successive times and the values of the parameter representative of the quantity of confirmed spatters that is determined for each of the initial images are compared in order to detect any variation in said parameter.

6. The method as claimed in claim 1, wherein said at least one initial image is acquired with the image-capturing device positioned at a distance comprised between 10 and 40 cm above the weld.

7. The method as claimed in claim 1, wherein, previously to step c), a position is assigned to each of the presumed spatters located in step b and said positions are each compared two by two, one of the two presumed spatters being ignored when the distance between the compared positions is smaller than a predetermined value.

8. The method as claimed in claim 1, wherein, in step c), the neural network comprises three convolutional layers, at least one fully connected layer, and at least one pooling layer, a pooling layer sandwiched between two convolutional layers.

9. The method as claimed in claim 1, wherein, in step c), the presumed spatters are classified into confirmed or unconfirmed spatters according to decision criteria defined via previous training of the neural network, said training being carried out by means of a set of training images comprising a plurality of sub-sets chosen from: a sub-set of training images each comprising at least one metal spatter, a sub-set of training images free of metal spatters, a sub-set of training images each comprising at least one defect, such as a scratch or a parasitic reflection, other than a spatter, a sub-set of training images each comprising at least one weld segment, said sub-sets each preferably comprising at least 1000 training images.

10. The method as claimed in claim 9, wherein, in step c), the extracts from the initial image that are input into the neural network are associated with at least one piece of context information chosen from: the material of the metal part, the welding gas, the weld joint configuration, the metal transfer regime, the welding current voltage, the welding current amperage, the wire feed speed.

11. The method as claimed in claim 1, further comprising, previously to step b), a step of pre-processing the initial image by applying at least one mask configured to remove from the initial image features other than spatters.

12. The method as claimed in claim 1, further comprising a step of remotely transmitting the initial image via a communication network from the image-capturing device to a remote server, steps b) to e) being carried out by an electronic processing system located in the remote server.

13. A device for determining the performance of a welding process configured to implement a method as claimed in claim 1, said device comprising:

an image-capturing device) configured to acquire said initial image, a memory for storing the initial image, an electronic processing system having access to said memory, said electronic processing system being configured to carry out the first digital processing operation and the second digital processing operation on the initial image, at least one neural network configured to receive as input extracts from the initial image and to classify presumed spatters into confirmed spatters or unconfirmed spatters, an electronic logic circuit configured to determine the performance of the welding process on the basis of the at least one parameter representative of the quantity of spatters determined by the second digital processing operation.

14. A computer program product downloadable from a communication network and/or stored on a medium that is computer readable and/or executable by a processor, comprising program-code instructions for implementing a method as claimed in claim 1.

* * * * *